(12) United States Patent
Nagafuchi et al.

(10) Patent No.: US 8,256,943 B2
(45) Date of Patent: Sep. 4, 2012

(54) VEHICLE LIGHT

(75) Inventors: Daisuke Nagafuchi, Tokyo (JP); Koji Sato, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 444 days.

(21) Appl. No.: 12/558,675

(22) Filed: Sep. 14, 2009

(65) Prior Publication Data

US 2010/0066249 A1    Mar. 18, 2010

(30) Foreign Application Priority Data

Sep. 12, 2008    (JP) ................................. 2008-235276

(51) Int. Cl.
*F21S 8/10* (2006.01)

(52) U.S. Cl. .......................... 362/545; 362/518; 362/522

(58) Field of Classification Search .................. 362/506, 362/507, 517, 518, 519, 520, 521, 522, 540, 362/543, 544, 545
See application file for complete search history.

(56) References Cited

U.S. PATENT DOCUMENTS

| | | | | |
|---|---|---|---|---|
| 1,647,150 A | * | 11/1927 | Ryan | 362/517 |
| 4,740,871 A | * | 4/1988 | Dilouya | 362/518 |
| 5,490,049 A | * | 2/1996 | Montalan et al. | 362/521 |
| 6,276,822 B1 | * | 8/2001 | Bedrosian et al. | 362/545 |
| 2003/0193815 A1 | | 10/2003 | Mishimagi | |
| 2004/0190303 A1 | | 9/2004 | Mishimagi | |

FOREIGN PATENT DOCUMENTS

| | | | |
|---|---|---|---|
| JP | 54045984 A | * | 4/1979 |
| JP | 2004-001710 A1 | | 1/2004 |

* cited by examiner

*Primary Examiner* — Y My Quach Lee
(74) *Attorney, Agent, or Firm* — Kenealy Vaidya LLP

(57) ABSTRACT

A vehicle light can simultaneously form a light distribution pattern for a tail/stop lamp in one direction and another light distribution pattern for a side marker lamp in another direction without use of a dedicated light source(s). The vehicle light can include: a cover lens having a lens portion and a wraparound lens portion extending from the lens portion to the vehicle side face; a first LED light source configured to form first and second light distribution patterns; and a first reflector configured to reflect a first part of light from the first LED light source so as to form the second light distribution pattern. The first LED light source can be disposed so that a second part of the light from the first LED light source passes through the wraparound lens portion to form the first light distribution pattern. The first reflector can be disposed between the first LED light source and the wraparound lens portion so that the first reflector does not block the second part of the light.

21 Claims, 8 Drawing Sheets

VEHICLE LIGHT

This application claims the priority benefit under 35 U.S.C. §119 of Japanese Patent Application No. 2008-235276 filed on Sep. 12, 2008, which is hereby incorporated in its entirety by reference.

TECHNICAL FIELD

The presently disclosed subject matter relates to a vehicle light that can simultaneously form a desired light distribution pattern (for example, for a tail/stop lamp) in one direction and another desired light distribution pattern (for example, for a side marker lamp) in another direction without employing dedicated light sources.

BACKGROUND ART

A known conventional vehicle light can have a lens portion and a wraparound lens portion extending from the lens portion to a vehicle side face (see, for example, Japanese Patent Application Laid-Open No. JP2004-001710A1).

Figure 1:
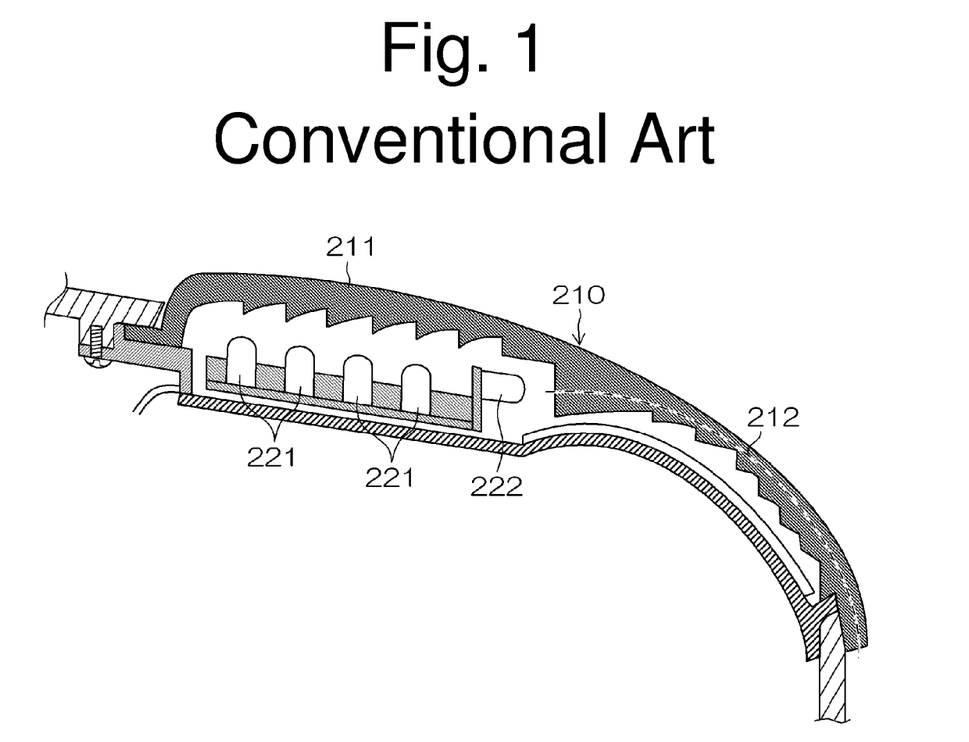
FIG. 1 is a diagram illustrating the configuration of a conventional vehicle light.

FIG. 1 is a diagram illustrating the configuration of the vehicle light disclosed in Japanese Patent Application Laid-Open No. JP2004-001710A1.

The vehicle light disclosed in Japanese Patent Application Laid-Open No. JP2004-001710A1, as shown in FIG. 1, includes a cover lens 210 having a lens portion 211 and a wraparound lens portion 212 extending from the lens portion 211 to a vehicle side face, LED light sources 221 for emitting light toward the lens portion 211, another LED light source 222 for emitting light toward the wraparound lens portion 212, and the like.

In the vehicle light disclosed in Japanese Patent Application Laid-Open No. JP2004-001710A1, the light emitted from the LED light sources 221 can pass through the lens portion 211 to be projected in front of a vehicle body where the vehicle light is installed. On the other hand, the light emitted from the LED light source 222 can pass through the wraparound lens portion 212 to be projected sideward.

SUMMARY

The vehicle light disclosed in Japanese Patent Application Laid-Open No. JP2004-001710A1, however, employs the dedicated light source 222 for emitting light toward the wraparound lens portion 211 in addition to the main LED light sources 221. Accordingly, the parts number, wiring and the like are increased to increase the costs therefor in addition to additional assembly processes.

The presently disclosed subject matter was devised in view of these and other problems characteristics and features in association with the conventional art. One aspect of the presently disclosed subject matter is to provide a vehicle light that can simultaneously form a desired light distribution pattern (for example, for a tail/stop lamp) in one direction and another desired light distribution pattern (for example, for a side marker lamp) in another direction without employing dedicated light sources.

According to another aspect of the presently disclosed subject matter, a vehicle light can include a cover lens having a lens portion and a wraparound lens portion extending from the lens portion to a side face of a vehicle, a first LED light source configured to form a first light distribution pattern (for example, a light distribution pattern for a side marker lamp) and a second light distribution pattern, and a first reflector configured to reflect a first part of light from the first LED light source so that the light passes through the lens portion to form the second light distribution pattern. In this vehicle light, the first LED light source can be disposed so that a second part of the light emitted from the first LED light source can pass through the wraparound lens portion to form the first light distribution pattern. The first reflector can be disposed between the first LED light source and the wraparound lens portion. In this configuration, the first reflector can avoid blocking the second part of the light from the first LED light source.

In the vehicle light according to the above aspect of the presently disclosed subject matter, the first reflector can be disposed between the first LED light source and the wraparound lens portion so as not to block the second part of the light emitted from the first LED light source, the second part of the light being configured to form the first light distribution pattern. Accordingly, the second part of the emitted light can pass unaffected by the first reflector and can pass through the wraparound lens portion of the cover lens, thereby forming the first light distribution pattern (for example, for a side marker lamp) satisfying a predetermined specification. The first reflector can reflect the first part of the light emitted from the first LED light source in a predetermined direction (for example, toward the rear of the vehicle), the first part of the light being configured to form the second light distribution pattern. The reflected light can pass through the lens portion of the cover lens so as to form the second light distribution pattern (for example, a light distribution pattern for a tail/stop lamp).

Accordingly, a vehicle light made in accordance with principles of the presently disclosed subject matter can avoid the need for a dedicated LED light source for forming a light distribution pattern for a side marker lamp, The vehicle can be configured to effectively use the first LED light source as a light source for forming both the first light distribution pattern and the second light distribution pattern. The first LED light source can simultaneously form the first light distribution pattern (for example, for a side marker lamp) and the second light distribution pattern (for example, for a tail/stop lamp). By configuring as such, the parts number, the parts costs, the assembly steps and the like can be reduced.

In the above vehicle light, the first reflector can be any of a multiple parabolic surface and a revolved parabolic surface having a focal point adjacent (i.e., at, or in the vicinity of) the first LED light source.

The first reflector can be disposed between the first LED light source and the wraparound lens portion so as not to block the second part of the emitted light for forming the first light distribution pattern for a side marker lamp because the first reflector is formed of a multiple parabolic surface or a revolved parabolic surface.

The above vehicle light can further include at least one second LED light source that is disposed closer to a center of the vehicle (in the width direction of the vehicle) than the first LED light source and configured to form the second light distribution pattern, and a second reflector configured to reflect light emitted from the second LED light source so that the light passes through the lens portion in order to form the second light distribution pattern.

The second LED light source can compensate for any shortage in the light amount from the first LED light source.

The above vehicle light can further include a bracket having at least a first stepped surface disposed in an outermost position in the width direction of the vehicle and a second stepped surface next to the first stepped surface and nearer to the center of the vehicle in the width direction. In this case, the first LED light source can be disposed at the first stepped surface and the second LED light source can be disposed at the second stepped surface, and the first LED light source and the second LED light source have respective optical axes directed in the same direction.

In the above vehicle light, the first and second LED light sources can be united by mounted them onto a common bracket. As the optical axes of the first and second LED light sources are directed in the same direction, assembly operations such as soldering of the respective LED light sources can be performed in the same direction (being the optical axis direction of the LED light source).

In the above vehicle light, the first LED light source can be provided in plural numbers so that the plurality of the first LED light sources constitutes a first LED light source line, and the second LED light source can be provided in plural numbers so that the plurality of the second LED light sources constitutes at least one second LED light source line. In this instance, the first LED light sources constituting the first LED light source line can be connected to each other in parallel, and the second LED light sources constituting the second LED light source line can be connected to each other in parallel. The first LED light source line can be connected to the second LED light source line in series. When the second LED light source line is provided in plural numbers, the second LED light source lines can be connected to each other in series. The vehicle light can include a drive circuit configured to supply a current for forming the second light distribution pattern, and cathodes of the first LED light source line can be connected to the ground, and anodes of the second LED light source line can be connected to the drive circuit. It should be noted that if the vehicle light includes a plurality of the second LED light source lines, the innermost second LED light source line that is positioned closest to the center of the vehicle is connected to the drive circuit. Furthermore, the vehicle light can include an additional circuit configured to supply an additional current, and anodes of the first LED light source line can be connected to the additional circuit.

As the additional current for the first and second light distribution patterns is supplied to the anodes of the first LED light source line, the first LED light source line can be supplied with the additional current, thereby increasing the light amount emitted from the plurality of first LED light sources. This configuration can satisfy the specified luminous intensity value of the light distribution pattern for a side marker lamp.

ADVANTAGEOUS EFFECTS OF INVENTION

Accordingly, the vehicle light made in accordance with the principles of the presently disclosed subject matter does not need any dedicated LED light source, but can advantageously form the first light distribution pattern for a side marker lamp and the second light distribution pattern for a tail/stop lamp. The vehicle light can achieve the reduction in the parts number, the parts costs, the assembly steps and the like.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to vehicle lights of the presently disclosed subject matter with reference to the accompanying drawings in accordance with exemplary embodiments.

Figure 2:
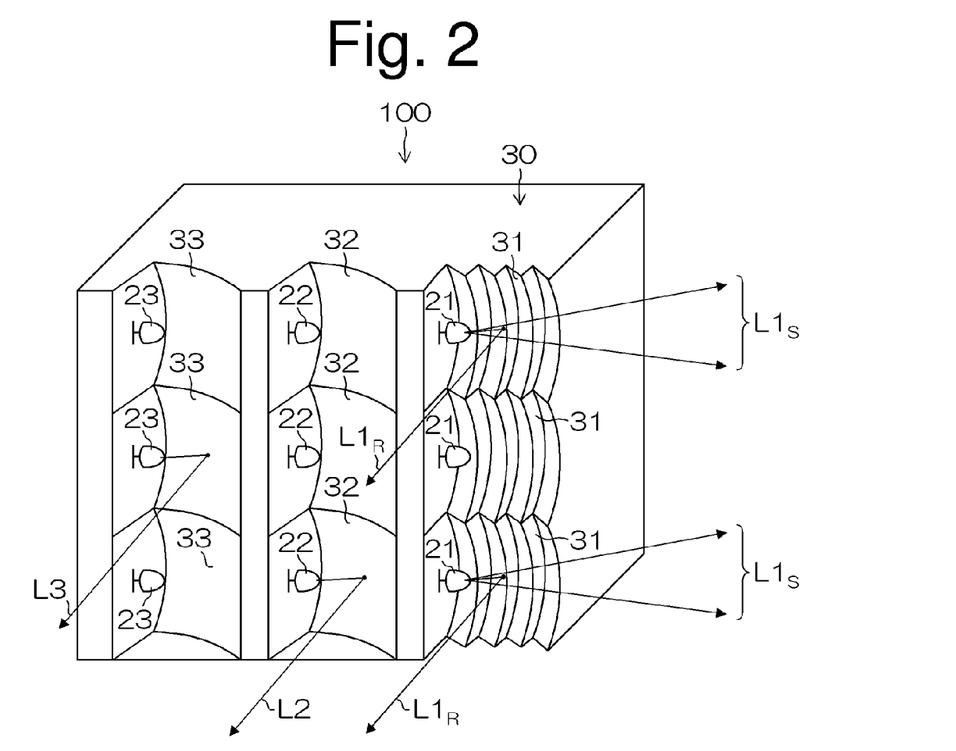
FIG. 2 is a perspective view illustrating one exemplary embodiment of a vehicle light made in accordance with principles of the presently disclosed subject matter.
Figure 3:
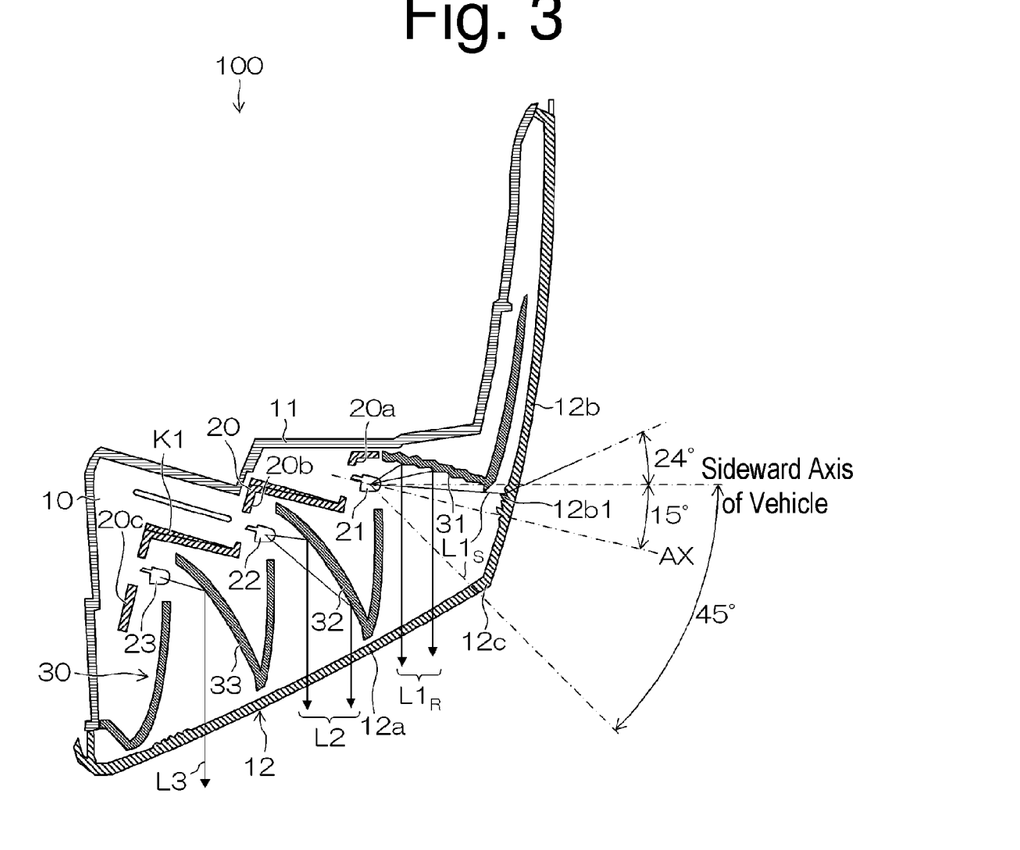
FIG. 3 is a horizontal cross-sectional view illustrating the vehicle light of FIG. 2, including LED light sources 21 to 23 (also including a reflector 31 as a multiple parabolic surface)

FIG. 2 is a perspective view showing a part of an exemplary embodiment of a vehicle light. FIG. 3 is a cross-sectional view illustrating the vehicle light of FIG. 2, cut along the horizontal plane including LED light sources 21 to 23.

The vehicle light 100 of the exemplary embodiment of FIG. 2 can be used as a vehicle signal light such as a stop lamp, a front turn signal lamp, a front parking lamp, and the like. In the presently described exemplary embodiment, the vehicle light can also serve as a side marker lamp. For example, the vehicle light 100 can be disposed at both the left and right sides in the rear or front part of the vehicle. Hereinafter, the vehicle light 100 will be described as a tail/stop lamp provided at the right side of the vehicle body in the rear part thereof. In the description, the width direction of the vehicle body can be referred to as a left to right direction or a horizontal direction, and the front-to-rear direction can be referred to as a longitudinal direction.

As shown in FIGS. 2 and 3, the vehicle light 100 can be configured to include a housing (to be disposed in the rear right part of the vehicle body), an outer lens 12 (also referred to as a cover lens) having a lens portion 12a and configured to define a lighting chamber 10 together with the housing 11, a bracket 20 disposed within the lighting chamber 10, a plurality of LED light sources including first LED light sources 21, second LED light sources 22, and third LED light sources 23, and a reflector 30 including first reflectors 31, second reflectors 32, and third reflectors 33, configured to reflect light emitted from the respective first to third LED light sources 21 to 23 rearward to allow the reflected light to pass through the lens portion 12a of the outer lens 12, thereby forming a light distribution pattern (also referred to as a second light distribution pattern) for a tail/stop lamp. The first to third LED light sources cooperate as the first LED light source 21 for use as a side marker lamp and a tail/stop lamp, and the second and third LED light sources 22 and 23 cooperate for use as a tail/stop lamp (also referred to as a second LED light source).

As shown in FIG. 3, the housing 11 can be fixed to the outer lens 12 by a known fixing member so as to define the lighting chamber 10. The outer lens 12 can include the lens portion 12a disposed along the rear face of the vehicle body while the portion 12a is fixed to the housing 11, and a wraparound lens portion 12b extending from the lens portion 12a via a curved portion 12c to the side surface of the vehicle body.

The bracket 20 and the reflector 30 can be disposed within the lighting chamber 10.

The bracket 20 can be fixed to the reflector 30 by a known fixing member.

The bracket 20 can be provided with the first LED light source 21 disposed at an outermost position in the horizontal direction while disposed within the lighting chamber 10, the second LED light source 22 disposed at a center position between the light sources 21 and 23, and the third LED light source 23 disposed at an innermost position near the center of the vehicle body. In the present exemplary embodiment, the LED light sources can be arranged in multiple steps (including a plurality of lines, with one line including a plurality of LED light sources) in order to ensure a sufficient light intensity. In FIG. 2, each line includes three LED light sources.

Each of the first to third LED light sources 21 to 23 can be a single color LED or a multi-color LED (including R, G and B), or a packaged LED including a single or a plurality of LED chips. Each of the first to third LED light sources 21 to 23 can be mounted on a substrate K1 such as a metal substrate. The substrate K1 can be mounted onto the bracket 20, thereby the first to third LED light sources 21 to 23 can be supported by the bracket 20. Accordingly, the LED light sources 21 to 23 can be integrated as a unit by mounting them onto the bracket 20.

The outermost first LED light source 21 can function as a light source for use as a side marker lamp and a tail/stop lamp. As shown in FIG. 3, the first LED light source 21 can be inserted into an opening formed in the outermost first stepped surface 20a so that the optical axis AX of the first LED light source 21 is inclined by a certain angle (for example, about 15°) with respect to the sideward axis of the vehicle body toward the rear direction. That is, the optical axis AX can be inclined toward the bottom of FIG. 3.

The middle-positioned second LED light source 22 can function as a light source for use as a tail/stop lamp. As shown in FIG. 3, the second LED light source 22 can be inserted into an opening formed in the middle-positioned second stepped surface 20b so that the optical axis (not illustrated) of the second LED light source 22 is inclined by a certain angle (for example, about 15°) with respect to the sideward axis of the vehicle body toward the rear direction as in the first LED light source 21. Namely, the optical axis of the second LED light source 22 can be directed in the same direction as the optical axis AX of the first LED light source 21.

The innermost third LED light source 23 can function as a light source for use as a tail/stop lamp. As shown in FIG. 3, the third LED light source 23 can be inserted into an opening formed in the innermost third stepped surface 20c so that the optical axis of the third LED light source 23 is inclined by a certain angle (for example, about 15°) with respect to the sideward axis of the vehicle body in the rear direction as in the first LED light source 21. Namely, the optical axis of the third LED light source 23 can be directed in the same direction as the optical axis AX of the first LED light source 21.

As described above, the LED light sources 21 to 23 can be integrated as a unit by mounting them onto the bracket 20. In this configuration, and with the optical axes of the first to third LED light sources directed in the same direction (i.e., substantially parallel to one another), assembly operations such as soldering of the respective first to third LED light sources 21 to 23 onto the substrate K1 can be performed in the same direction (i.e., substantially parallel to the optical axes of the first to third LED light sources 21 to 23).

The reflector 30 can be fixed to the outer lens 12 by a known fixing member.

As shown in FIGS. 2 and 3, the reflector 30 can be provided with the first reflectors 31 disposed at an outermost position in the horizontal direction while disposed within the lighting chamber 10, the second reflectors 32 disposed at a center position between reflectors, and the third reflectors 33 disposed at an innermost position near the center of the vehicle body.

Figure 4:
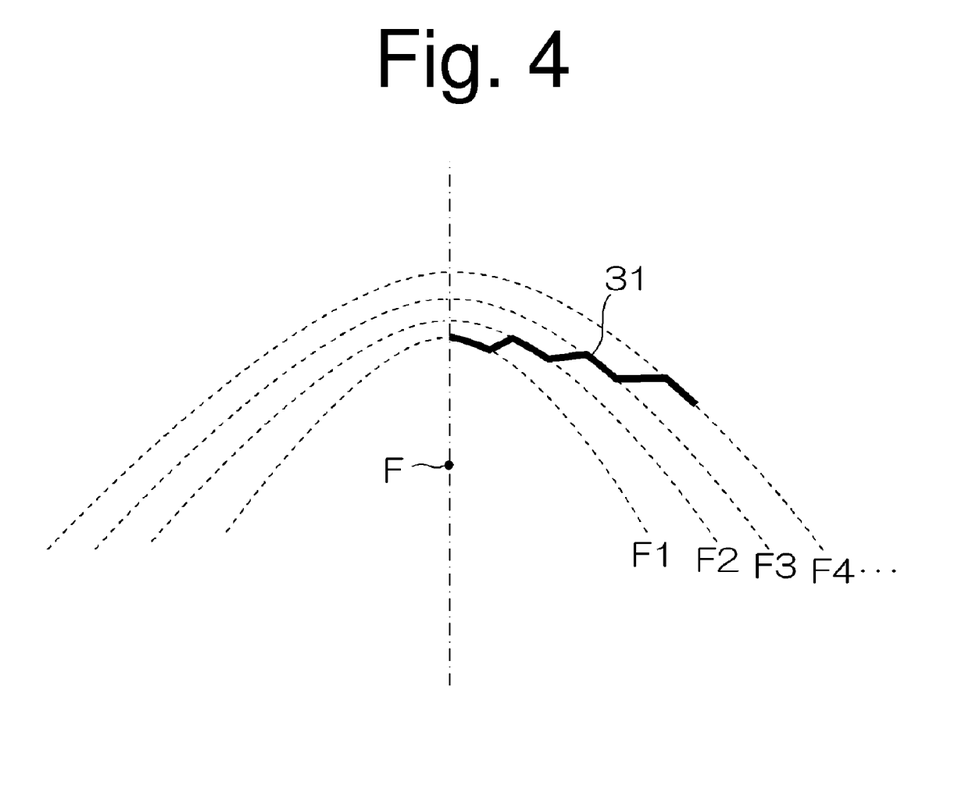
FIG. 4 is an exemplary diagram illustrating a multiple parabolic surface.

As shown in FIG. 4, the first reflector 31 can be a multiple parabolic surface having a focal point F adjacent (i.e., at, or in the vicinity of) the first LED light source 21, and can be configured to include a plurality of revolved parabolic surfaces having different F values and having been cut and connected to form a stepped surface as a whole. It should be noted that the indications of "F1" to "F4" in FIG. 4 represent respective F values of the revolved parabolic surfaces, and examples thereof can be F1=10, F2=11, F2=12, F4=13, and the like.

The first reflector 31 can be configured to allow the first LED light source 21 to simultaneously function as a light source for a side marker lamp and a tail/stop lamp. In order to do so, as shown in FIG. 3, the first reflector 31 can be disposed between the first LED light source 21 and the wraparound lens portion 12b so that the first reflector 31 does not block a part $L1_S$ of the light emitted from the first LED light source 21, the part $L1_S$ of the light being configured to form a light distribution pattern for a side marker lamp. It should be noted that, in order to diffuse the light emitted from the first LED light source 21 by desired angles, the outer lens 12 can be provided with a lens cut portion 12b1 formed on it.

The first reflector 31 can reflect another part of light, emitted from the first LED light source 21 and forming a light distribution pattern for a tail/stop lamp (denoted by $L1_R$ in FIGS. 2 and 3), in the rear direction, thereby allowing the reflected light $L1_R$ to pass through the lens portion 12a of the outer lens 12. Accordingly, the projected light can form the light distribution pattern for a tail/stop lamp.

The part $L1_S$ of light, emitted from the first LED light source 21 and forming a light distribution pattern for a side marker lamp, can pass unblocked by the first reflector 31 as shown in FIG. 3, thereby allowing the light $L1_S$ to pass through the wraparound lens portion 12b of the outer lens 12. Furthermore, a part of the projected light $L1_S$ can be diffused by the lens cut portion 12b1 of the outer lens 12 in a front direction of the vehicle (i.e., toward the top of FIG. 3). In this illustrated exemplary embodiment, the light can be refracted by an angle of 24° in the front direction with respect to the sideward axis of the vehicle body. The diffused light can be projected in a range of 45° in the rear direction to 24° in the front direction with respect to the sideward axis of the vehicle body in accordance with particular regulations. Accordingly, the vehicle light configured as described above can form a light distribution pattern for a side marker lamp that can satisfy the appropriate specification.

As the outer lens 12 can have the lens cut portion 12b1, even when the light source for a side marker lamp cannot provide a sufficient light amount in the front direction at a certain angle due to the design limitation or the available reflector configuration, the first LED light source 21 can provide light refracted by an appropriate angle. Accordingly, the light distribution pattern for a side marker lamp satisfying an appropriate specification can be formed. The lens cut portion 12b1 can overlie the openings formed in the respective first to third stepped surface 20a to 20c. Accordingly, the openings can be prevented from being directly viewed externally, thereby improving the outer appearance.

The second reflector 32 can be a revolved parabolic reflector having a focal point adjacent (i.e., at, or in the vicinity of) the second LED light source 22, and can be disposed nearer to the center of the vehicle body than the first reflector 31. The second reflector 32 can reflect light emitted from the second LED light source 22 in the rear direction of the vehicle (as denoted by L2 in FIGS. 2 and 3). The reflected light can pass through the lens portion 12a of the outer lens 12 to form the light distribution pattern for a tail/stop lamp.

Similarly, the third reflector 33 can be a revolved parabolic reflector having a focal point adjacent (i.e., at, or in the vicinity of) the third LED light source 23, and can be disposed nearest to the center of the vehicle body among three reflectors 31 to 33. The third reflector 33 can reflect light emitted from the third LED light source 23 in the rear direction of the vehicle (as denoted by L3 in FIGS. 2 and 3). The reflected light can pass through the lens portion 12a of the outer lens 12 to form the light distribution pattern for a tail/stop lamp.

A description will now be given of a circuit configuration of the respective first to third LED light sources 21 to 23 and a drive circuit for these LED light sources 21 to 23.

Figure 6:
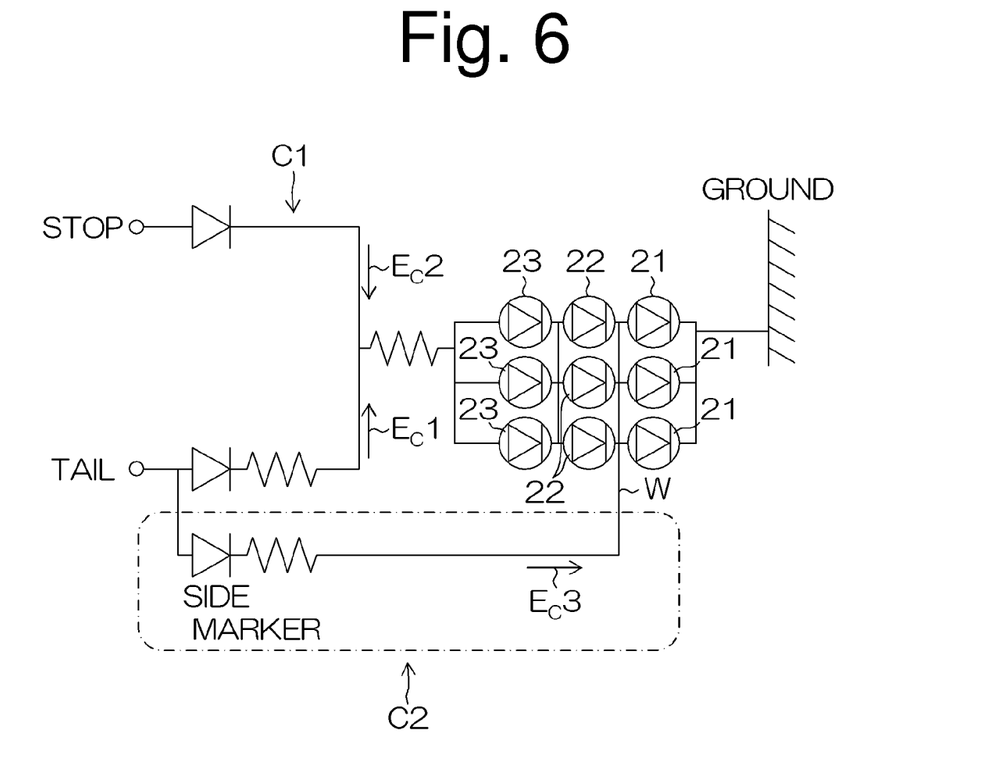
FIG. 6 is an exemplary circuit diagram including respective LED light sources 21 to 23 and a drive circuit therefore.
Figure 7:
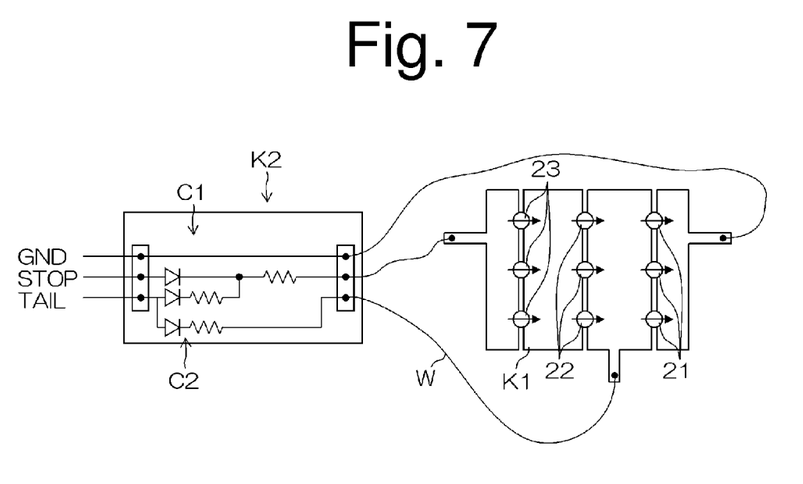
FIG. 7 is another exemplary circuit diagram including respective LED light sources 21 to 23 and a drive circuit therefore.

FIGS. 6 and 7 illustrate an exemplary drive circuit for the light sources of a vehicle light in accordance with the present exemplary embodiment of FIGS. 2 and 3. As shown in the drawings, the LED light sources constituting each LED light source line (for example, the three first LED light sources 21 constituting the first LED light source line) can be connected to each other in parallel. Then, the LED light source lines (for example, the first LED light source line and the second LED light source line) can be connected to each other in series. FIG. 7 is a circuit diagram illustrating a concrete configuration of the drive circuit using substrates. Specifically, the first to third LED light sources 21 to 23 are connected using a substrate K2. Examples of the substrate K2 include a metal substrate, a glass epoxy substrate, and the like.

The vehicle light can include a drive circuit C1 configured to supply a current Ec1 for forming the light distribution pattern for a tail lamp or a current Ec2 for forming the light distribution pattern for a tail/stop lamp. Cathodes of the first LED light source line can be connected to the ground. Anodes of the third LED light source line can be connected to the drive circuit C1. It should be noted that resistors in FIGS. 6 and 7 are used to limit a current to the first to third LED light sources 21 to 23 to prevent any overcurrent, and diodes operate as rectifiers.

In this circuit configuration, the third LED light source line can be supplied at the anodes with the current Ec1 for a tail lamp or the current Ec2 for a tail/stop lamp. When a current is supplied to the respective first to third LED light sources 21 to 23, the light distribution pattern for a tail lamp or for a tail/stop lamp and the light distribution pattern for a side marker lamp can be formed simultaneously.

In some cases, a current supplied only to the anodes of the third LED light source line may not be sufficient for the first LED light source line. In this case, the light from the first LED light source line may not satisfy a specified luminous intensity value of the light distribution pattern for a side marker lamp. To cope with this problem, an additional circuit C2 can be provided. The additional circuit C2 can be configured to supply the anodes of the first LED light sources 21 with an additional current Ec3 for a tail/stop lamp and for a side marker lamp. The additional circuit C2 can include a diode and a resistor connected in series as shown in FIGS. 6 and 7, and can be connected to the anodes of the first LED light sources 21 by way of a wiring W.

In this circuit configuration, the current Ec3 is additionally supplied to the anodes of the first LED light source line. Namely, the additional current Ec3 can flow through the first LED light source line, thereby increasing the light amount emitted from the three first LED light source 21 constituting the first LED light source line. The increased light amount can satisfy a specified luminous intensity value of the light distribution pattern for a side marker lamp.

In the above exemplary embodiment, the first LED light sources 21 are disposed downstream in the circuit (the farthest position in the series circuit). The additional current Ec3 can be supplied only to the first LED light sources 21 in the downstream of the circuit, and accordingly, only the light amount from the first LED light sources 21 can be increased.

In the above circuit configuration, in addition to the additional current Ec3, the current Ec2 for a tail/stop lamp can be supplied to the anodes of the third LED light source line. Accordingly, the current can also be supplied to the first LED light source line, thereby increasing the luminous intensity of the three first LED light sources 21 constituting the first LED light source line. In this case, however, there is no upper limit in the light distribution specification for a rear side marker lamp in the North American Standard. Accordingly, the increased intensity for a side marker lamp can remain compliant.

Figure 8:
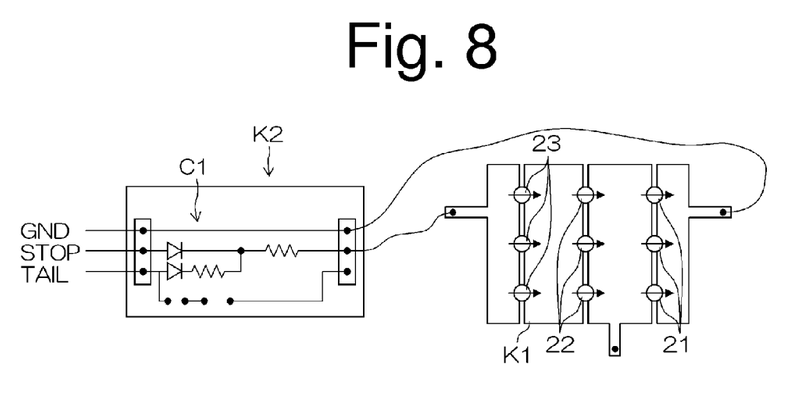
FIG. 8 is still another exemplary circuit diagram including respective LED light sources 21 to 23 and a drive circuit therefore.

It should be appreciated that the drive circuit C1 and the additional circuit C2 can be mounted on the same control substrate K2 as shown in FIG. 7. In this case, by connecting the control substrate K2 to the substrate K1, where the first to third LED light sources 21 to 23 have been mounted, with three wirings W (for example, a ground wire, a tail/stop-lamp wire, and a side-marker-lamp additional wire), there can be provided a vehicle light 100 having a side marker lamp function for a country or regulatory area where the side marker lamp function is required in the vehicle light (for example, for the United States). Advantageously, the side-marker-lamp additional wire can be omitted in the same configuration, as shown in FIG. 8. Accordingly, the control substrate K2 and the substrate K1 can be connected by the two wirings. This configuration can decrease the light intensity for a side marker lamp. Accordingly, the thus configured vehicle light 100 can serve as a vehicle light having no side marker lamp function, for a country or regulatory area where the side marker lamp function is not required in the vehicle light (for example, European countries). In this case, the components for the additional circuit C2 can be omitted from the substrate K2, thereby decreasing the components costs and assembly costs.

As shown in FIGS. 7 and 8, the drive circuit C1 and the additional circuit C2 can be mounted on the same control substrate K2 to share the substrate K2. Accordingly, this configuration can reduce the circuit patterning costs. Furthermore, the LED unit including the first to third LED light sources 21 to 23 and the substrate K1 can be shared by the vehicle lights with or without a side marker lamp function. This also can reduce the circuit patterning costs for forming these substrates.

As described above, the first reflector 31 of the vehicle light 100 of the presently described exemplary embodiment can be disposed between the first LED light source 21 and the wraparound lens portion 12b so that the first reflector 31 does not block the part $L1_S$ of the light emitted from the first LED light source 21, the part $L1_S$ of the light being configured to form the light distribution pattern for a side marker lamp.

Accordingly, in the vehicle light 100, the part $L1_S$ of light emitted from the first LED light source 21 and forming the light distribution pattern for a side marker lamp can pass unblocked by the first reflector 31 and can pass through the wraparound lens portion 12b of the outer lens 12, thereby forming the light distribution pattern for a side marker lamp satisfying the appropriate specification. The first reflector 31 can reflect another part $L1_R$ of light emitted from the first LED light source 21 and forming the light distribution pattern for a tail/stop lamp in the rear direction, thereby allowing the reflected light $L1_R$ to pass through the lens portion 12a of the outer lens 12 for forming the light distribution pattern for a tail/stop lamp.

In other words, the vehicle light 100 may not require a dedicated LED light source, while the first LED light source 21 can be used as both the light source for a tail/stop lamp and one for a side marker lamp. This configuration can simultaneously provide the light distribution pattern for a tail/stop lamp and the light distribution pattern for a side marker lamp. Thereby it is possible to decrease the components costs and assembly costs.

Figure 5:
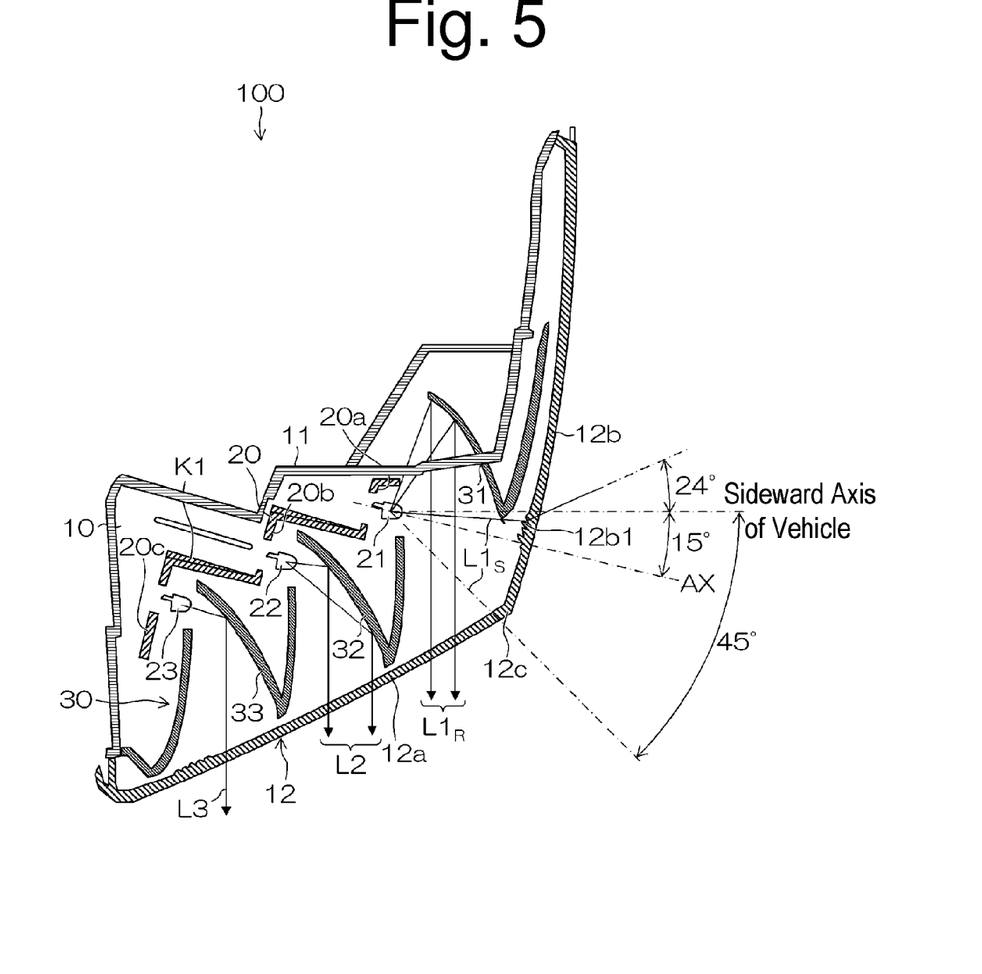
FIG. 5 is a diagram illustrating a modified example of the vehicle light of FIG. 2, showing a reflector 31 which is a revolved parabolic surface having a relatively large F value.

In the vehicle light 100, the first reflector 31 can be a multiple parabolic surface or a revolved parabolic surface having a focal point adjacent (i.e., at, or in the vicinity of) the first LED light source 21 (see FIGS. 3 to 5). Accordingly, the first reflector 31 can be disposed between the first LED light source 21 and the wraparound lens portion 12b so as not to block the part $L1_S$ of the light emitted from the first LED light source 21 for forming the light distribution pattern for a side marker lamp.

The vehicle light 100 can have the second and third LED light sources 22 and 23 nearer to the center of the vehicle body (in the width direction) that can compensate for any shortage in the light amount from the first LED light source 21.

A description will now be given of a modified exemplary embodiment made in accordance with the principles of the presently disclosed subject matter.

In the above exemplary embodiment, the outermost first reflector 31 can be a multiple parabolic surface having a focal point F adjacent (i.e., at, or in the vicinity of) the first LED light source 21, and configured to include a plurality of revolved parabolic surfaces having different F values and having been cut and connected to form a stepped surface as a whole. The presently disclosed subject matter, however, is not limited to this particular embodiment. For example, as shown in FIG. 5, the first reflector 31 can be a revolved parabolic surface having a focal point F adjacent (i.e., at, or in the vicinity of) the first LED light source 21 and having a relatively large F value (for example, the F value can be equal to 30).

In the above exemplary embodiment, the optical axis of the first LED light source 21 can be inclined by, for example, about 15° with respect to the sideward axis of the vehicle body in the rear direction. The presently disclosed subject matter, however, is not limited to this particular embodiment. For example, the optical axis of the first LED light source 21 can be inclined by an angle ranging from 15° in the rear direction of the vehicle to 15° in the front direction.

In the above exemplary embodiment, a part of the light emitted from the first LED light source 21 can be diffused (refracted) by the lens cut portion 12b1 formed in the outer lens 12 by an angle of 24° in the front direction of the vehicle with respect to the sideward axis of the vehicle body. The presently disclosed subject matter, however, is not limited to this particular embodiment. The part of the light emitted from the first LED light source 21 can also be diffused (refracted) by the lens cut portion 12b1 by an angle ranging from 20° to 30°.

Figure 9:
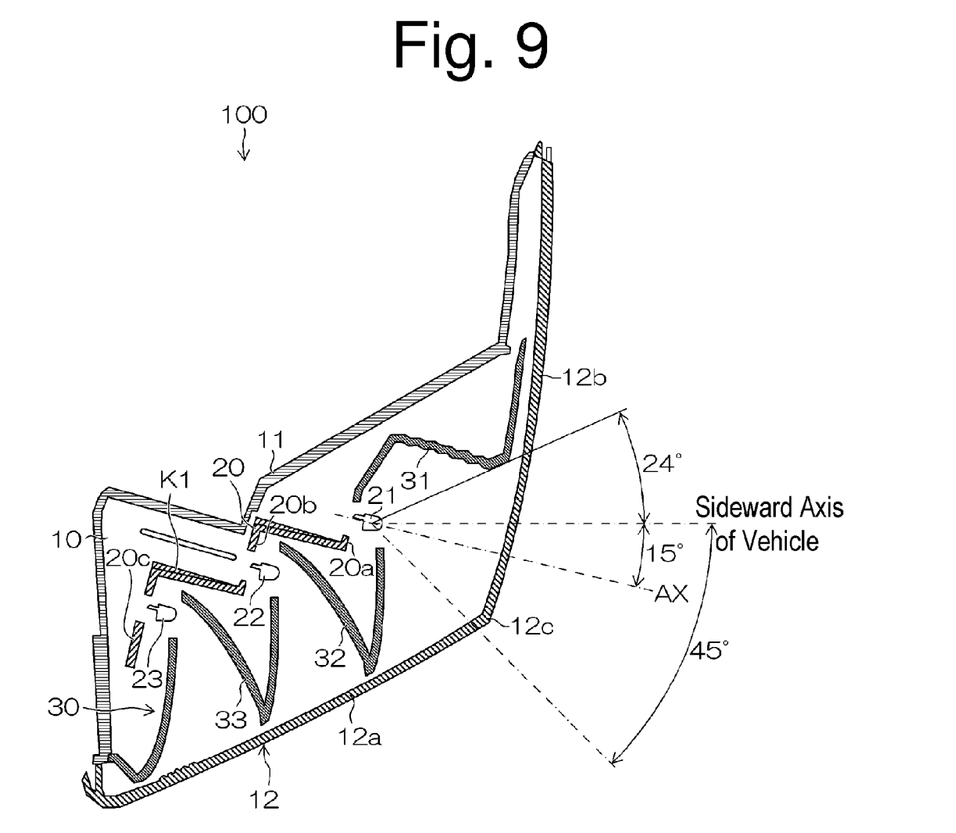
FIG. 9 is a diagram illustrating a modified example of the vehicle light of FIG. 2, showing an outer lens (or cover lens) having no lens cut portion 12b1.

In the above exemplary embodiment, the outer lens 12 has the lens cut portion 12b1 formed therein. The presently disclosed subject matter, however, is not limited to this particular embodiment. When there is no design limitation, such a lens cut portion can be omitted as shown in FIG. 9.

In the above exemplary embodiment, the first to third LED light sources 21 to 23 can be arranged in multiple steps (including a plurality of lines, with one line including a plurality of LED light sources). The presently disclosed subject matter, however, is not limited to this particular embodiment. If a high intensity LED light source is employed as the first LED light source 21, the number of the second (and/or third) LED light sources 22 (23) can be decreased or they can be omitted in some cases (or can even added to).

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle light for use in a vehicle having a side surface, the vehicle light comprising:
    a cover lens having a lens portion and a wraparound lens portion extending from the lens portion, the wraparound lens portion configured to extend along the side surface of the vehicle when the vehicle light is mounted to the vehicle;
    a first LED light source configured to form a first light distribution pattern and a second light distribution pattern;
    a first reflector configured to reflect a first part of light from the first LED light source so that the first part of light passes through the lens portion to form the second light distribution pattern, the first reflector is disposed between the first LED light source and the wraparound lens portion;
    at least one second LED light source that is disposed closer to a center of the vehicle in a width direction of the vehicle than the first LED light source when the vehicle light is mounted to the vehicle, and configured to form the second light distribution pattern; and
    a second reflector configured to reflect light emitted from the second LED light source so as to allow the light to pass through the lens portion in order to form the second light distribution pattern,
    wherein the first LED light source and the first reflector are disposed such that a second part of light from the first LED light source passes unaffected by the first reflector and directly passes through the wraparound lens portion to form the first light distribution pattern, and the first LED light source has an optical axis on which the first reflector is not disposed and which is located within the second part of light.

2. The vehicle light according to claim 1, wherein the first light distribution pattern is a light distribution pattern for a side marker lamp.

3. The vehicle light according to claim 2, wherein the first reflector is at least one of a multiple parabolic surface and a revolved parabolic surface having a focal point adjacent the first LED light source.

4. The vehicle light according to claim 3, further comprising:
    a bracket having at least a first stepped surface disposed in an outermost position in the width direction of the vehicle and a second stepped surface adjacent the first stepped surface and nearer to the center of the vehicle in the width direction when the vehicle light is mounted to the vehicle, with the first LED light source being disposed at the first stepped surface and the second LED light source being disposed at the second stepped surface, and wherein the first LED light source and the second LED light source each have a respective optical axis oriented in a same direction.

5. The vehicle light according to claim 4, further comprising:

a drive circuit configured to supply a current for forming the first and second light distribution patterns and an additional circuit configured to supply an additional current, and wherein:

the first LED light source includes a first plurality of LED light sources oriented along a first LED light source line, and the second LED light source includes a second plurality of LED light sources oriented along at least one second LED light source line;

the first plurality of LED light sources are connected to each other in parallel, and the second plurality of LED light sources are connected to each other in parallel;

the first LED light source line is connected to the second LED light source line in series;

each of the first plurality of LED light sources includes a respective cathode connected to ground and a respective anode connected to the additional circuit; and each of the second plurality of LED light sources includes a respective anode connected to the drive circuit.

6. The vehicle light according to claim 3, further comprising:

a drive circuit configured to supply a current for forming the first and second light distribution patterns and an additional circuit configured to supply an additional current, and wherein:

the first LED light source includes a first plurality of LED light sources oriented along a first LED light source line, and the second LED light source includes a second plurality of LED light sources oriented along at least one second LED light source line;

the first plurality of LED light sources are connected to each other in parallel, and the second plurality of LED light sources are connected to each other in parallel;

the first LED light source line is connected to the second LED light source line in series;

each of the first plurality of LED light sources includes a respective cathode connected to ground and a respective anode connected to the additional circuit; and each of the second plurality of LED light sources includes a respective anode connected to the drive circuit.

7. The vehicle light according to claim 2, further comprising:

a bracket having at least a first stepped surface disposed in an outermost position in the width direction of the vehicle and a second stepped surface adjacent the first stepped surface and nearer to the center of the vehicle in the width direction when the vehicle light is mounted to the vehicle, with the first LED light source being disposed at the first stepped surface and the second LED light source being disposed at the second stepped surface, and wherein the first LED light source and the second LED light source each have a respective optical axis oriented in a same direction.

8. The vehicle light according to claim 7, further comprising:

a drive circuit configured to supply a current for forming the first and second light distribution patterns and an additional circuit configured to supply an additional current, and wherein:

the first LED light source includes a first plurality of LED light sources oriented along a first LED light source line, and the second LED light source includes a second plurality of LED light sources oriented along at least one second LED light source line;

the first plurality of LED light sources are connected to each other in parallel, and the second plurality of LED light sources are connected to each other in parallel;

the first LED light source line is connected to the second LED light source line in series;

each of the first plurality of LED light sources includes a respective cathode connected to ground and a respective anode connected to the additional circuit; and each of the second plurality of LED light sources includes a respective anode connected to the drive circuit.

9. The vehicle light according to claim 2, wherein the wraparound lens portion comprises a lens cut portion configured such that the second part of the light from the first LED light source is diffused in other directions.

10. The vehicle light according to claim 1, wherein the first reflector is at least one of a multiple parabolic surface and a revolved parabolic surface having a focal point adjacent the first LED light source.

11. The vehicle light according to claim 10, further comprising:

a bracket having at least a first stepped surface disposed in an outermost position in the width direction of the vehicle and a second stepped surface adjacent the first stepped surface and nearer to the center of the vehicle in the width direction when the vehicle light is mounted to the vehicle, with the first LED light source being disposed at the first stepped surface and the second LED light source being disposed at the second stepped surface, and wherein the first LED light source and the second LED light source each have a respective optical axis oriented in a same direction.

12. The vehicle light according to claim 11, further comprising:

a drive circuit configured to supply a current for forming the first and second light distribution patterns and an additional circuit configured to supply an additional current, and wherein:

the first LED light source includes a first plurality of LED light sources oriented along a first LED light source line, and the second LED light source includes a second plurality of LED light sources oriented along at least one second LED light source line;

the first plurality of LED light sources are connected to each other in parallel, and the second plurality of LED light sources are connected to each other in parallel;

the first LED light source line is connected to the second LED light source line in series;

each of the first plurality of LED light sources includes a respective cathode connected to ground and a respective anode connected to the additional circuit; and each of the second plurality of LED light sources includes a respective anode connected to the drive circuit.

13. The vehicle light according to claim 10, further comprising:

a drive circuit configured to supply a current for forming the first and second light distribution patterns and an additional circuit configured to supply an additional current, and wherein:

the first LED light source includes a first plurality of LED light sources oriented along a first LED light source line, and the second LED light source includes a second plurality of LED light sources oriented along at least one second LED light source line;

the first plurality of LED light sources are connected to each other in parallel, and the second plurality of LED light sources are connected to each other in parallel;

the first LED light source line is connected to the second LED light source line in series each of the first plurality of LED light sources includes a respective cathode connected to ground and a respective anode connected to the additional circuit; and each of the second plurality of LED light sources includes a respective anode connected to the drive circuit.

14. The vehicle light according to claim 1, further comprising:

a bracket having at least a first stepped surface disposed in an outermost position in the width direction of the vehicle and a second stepped surface adjacent the first stepped surface and nearer to the center of the vehicle in the width direction when the vehicle light is mounted to the vehicle, with the first LED light source being disposed at the first stepped surface and the second LED light source being disposed at the second stepped surface, and wherein the first LED light source and the second LED light source each have a respective optical axis oriented in a same direction.

15. The vehicle light according to claim 14, further comprising:

a drive circuit configured to supply a current for forming the first and second light distribution patterns and an additional circuit configured to supply an additional current, and wherein:

the first LED light source includes a first plurality of LED light sources oriented along a first LED light source line, and the second LED light source includes a second plurality of LED light sources oriented along at least one second LED light source line;

the first plurality of LED light sources are connected to each other in parallel, and the second plurality of LED light sources are connected to each other in parallel;

the first LED light source line is connected to the second LED light source line in series;

each of the first plurality of LED light sources includes a respective cathode connected to ground and a respective anode connected to the additional circuit; and each of the second plurality of LED light sources includes a respective anode connected to the drive circuit.

16. The vehicle light according to claim 2, further comprising:

a drive circuit configured to supply a current for forming the first and second light distribution patterns and an additional circuit configured to supply an additional current, and wherein:

the first LED light source includes a first plurality of LED light sources oriented along a first LED light source line, and the second LED light source includes a second plurality of LED light sources oriented along at least one second LED light source line;

the first plurality of LED light sources are connected to each other in parallel, and the second plurality of LED light sources are connected to each other in parallel;

the first LED light source line is connected to the second LED light source line in series;

each of the first plurality of LED light sources includes a respective cathode connected to ground and a respective anode connected to the additional circuit; and each of the second plurality of LED light sources includes a respective anode connected to the drive circuit.

17. The vehicle light according to claim 16, wherein the drive circuit and the additional circuit are mounted on a first substrate, and the first plurality of LED light sources and the second plurality of LED light sources are mounted on a second substrate.

18. The vehicle light according to claim 1, further comprising:

a drive circuit configured to supply a current for forming the first and second light distribution patterns and an additional circuit configured to supply an additional current, and wherein:

the first LED light source includes a first plurality of LED light sources oriented along a first LED light source line, and the second LED light source includes a second plurality of LED light sources oriented along at least one second LED light source line;

the first plurality of LED light sources are connected to each other in parallel, and the second plurality of LED light sources are connected to each other in parallel;

the first LED light source line is connected to the second LED light source line in series;

each of the first plurality of LED light sources includes a respective cathode connected to ground and a respective anode connected to the additional circuit; and each of the second plurality of LED light sources includes a respective anode connected to the drive circuit.

19. The vehicle light according to claim 18, wherein:

the second plurality of LED light sources includes a first subset of LED light sources and a second subset of LED light sources;

the first subset of LED light sources are oriented along the second LED light source line and the second subset of LED light sources are oriented along a third LED light source line; and the second LED light source line is connected in series with the third LED light source line.

20. A vehicle light for use in a vehicle having a side surface, the vehicle light comprising:

a cover lens having a lens portion and a wraparound lens portion extending from the lens portion, the wraparound lens portion configured to extend along the side surface of the vehicle when the vehicle light is mounted to the vehicle;

a first LED light source configured to form a first light distribution pattern and a second light distribution pattern; and a first reflector configured to reflect a first part of light from the first LED light source so that the first part of light passes through the lens portion to form the second light distribution pattern, the first reflector is disposed between the first LED light source and the wraparound lens portion, wherein the first LED light source and the first reflector are disposed such that a second part of light from the first LED light source passes unaffected by the first reflector and passes through the wraparound lens portion to form the first light distribution pattern;

wherein the first light distribution pattern is a light distribution pattern for a side marker lamp; and wherein the first reflector is a multiple parabolic surface having a focal point adjacent the first LED light source, and includes a plurality of revolved parabolic surfaces having different F values, the revolved parabolic surfaces being cut and connected to form a stepped surface as a whole.

21. A vehicle light for use in a vehicle having a side surface, the vehicle light comprising:

a cover lens having a lens portion and a wraparound lens portion extending from the lens portion, the wraparound lens portion configured to extend along the side surface of the vehicle when the vehicle light is mounted to the vehicle;

a first LED light source having an optical axis that is configured to form a first light distribution pattern and a second light distribution pattern; and a first reflector having a longitudinal axis and having at least a portion of the reflector configured to reflect a first part of light from the first LED light source so that the first part of light passes through the lens portion to form the second light distribution pattern, the first reflector is disposed between the first LED light source and the wraparound lens portion, wherein the first LED light source and the first reflector are disposed such that a second part of light from the first LED light source passes unaffected by the first reflector and passes through the wraparound lens portion to form the first light distribution pattern; and wherein the optical axis of the LED intersects the longitudinal axis of the portion of the first reflector forming the second light distribution pattern at a point in front of the LED.

\* \* \* \* \*